Patented Mar. 4, 1952

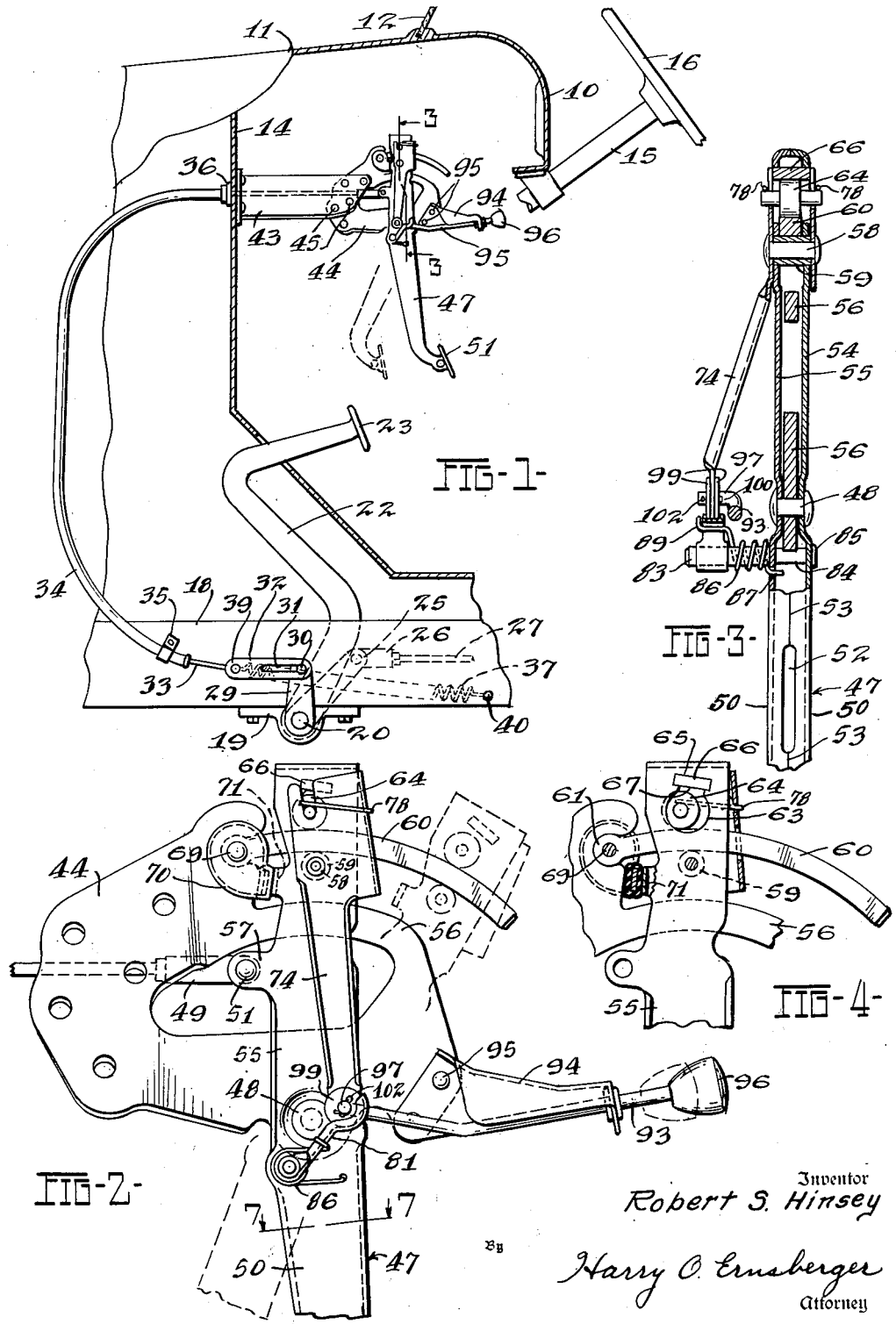

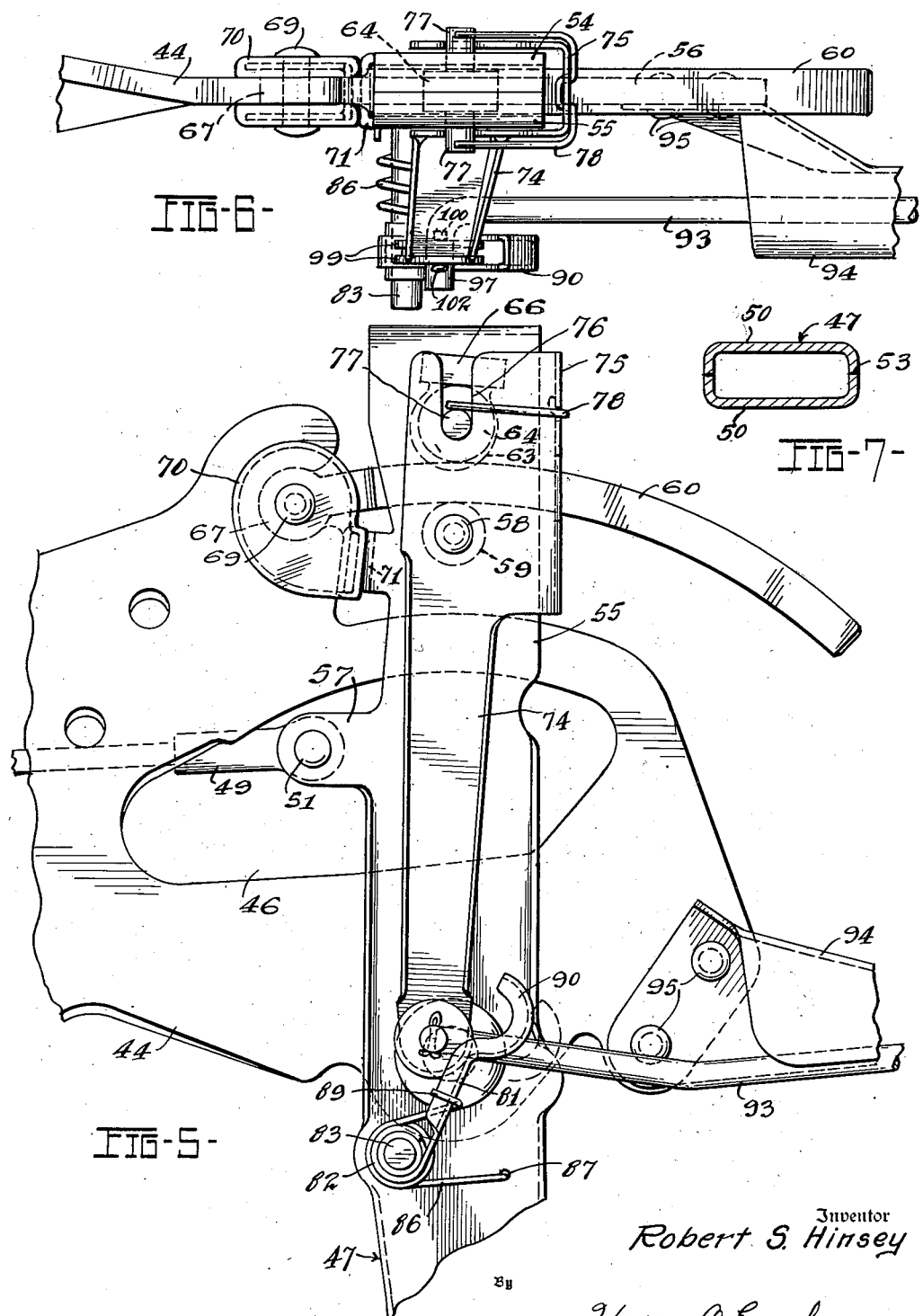

2,587,725

UNITED STATES PATENT OFFICE 2,587,725

MECHANISM CONTROL

Robert S. Hinsey, Toledo, Ohio, assignor to The Bingham-Herbrand Company, Toledo, Ohio, a corporation of Ohio Application June 2, 1948, Serial No. 30,685

2 Claims. (Cl. 74—531)

1

This invention relates to mechanism control devices and more particularly to means for actuating or controlling brake mechanism of a vehicle.

The invention comprehends the provision of a foot operated lever construction incorporating a clutch means of such a character that the lever may be frictionally retained in any position of adjustment and readily released when desired.

An object of the invention resides in the provision of a foot operated lever mechanism embodying a friction clutch means having a block of hardened material cooperating with a roller in order to frictionally retain the lever arrangement in adjusted or "brake set" position in combination with an independently actuated clutch releasing means.

A further object of the invention is the provision of a foot operated lever mechanism in which the lever body is formed of sheet metal and having an abutment or element of the clutching mechanism for retaining the lever in adjusted position interlocked with the sheet material of the lever construction whereby the thrust of the clutch pressure is transmitted directly to the lever body.

Another object of the invention resides in a roller clutch locking means for lever mechanism in which an abutment forming an element of the clutch construction may be hardened independently of the other elements of the lever mechanism and snugly fitted in the walls of the lever body, thus eliminating drilling operations and simplifying the lever assembly and at the same time providing adequate bearing area for transmitting thrust on the clutch abutment directly to the body of the lever.

Further objects and advantages are within the scope of this invention such as relate to the arrangement operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view partly in section showing a portion of an operator's compartment of the vehicle and illustrating an installation of mechanism control of my invention;

Figure 2 is a side elevational view of the upper portion of the lever mechanism;

Figure 3 is a front elevational view of the arrangement shown in Figure 2, certain parts being shown in section;

2

Figure 4 is an elevational view of a portion of the mechanism shown in Figure 2 with a portion of the clutch releasing member shown in section;

Figure 5 is an enlarged view of the lever mechanism illustrated in Figure 2 with the clutch mechanism shown in operative or clutching position;

Figure 6 is a top plan view of the arrangement shown in Figure 5, and

Figure 7 is a sectional view taken substantially on the line 7—7 of Figure 2.

While I have shown a form of control mechanism of my invention as installed in a vehicle for actuating or controlling the emergency or parking brakes, it is to be understood that I contemplate the incorporation of my invention with any apparatus where it may be found to have utility.

Referring to the drawings in detail and first with reference to Figure 1, there is shown a portion of a vehicle adjacent the operator's compartment wherein 10 designates an instrument panel, 11 a cowl portion of the vehicle, 12 a windshield, 14 a dash board, and a post 15 on the upper end of which is mounted a steering wheel 16. A portion of the frame of the vehicle is illustrated at 18 to which is secured a bracket 19 upon which is journaled a transversely extending shaft 20. Fixedly secured to the shaft 20 is a service brake pedal 22 having a foot pad portion 23. Also fixedly mounted upon the shaft 20 is an arm 25 to the extremity of which is pivotally connected a clevis 26, the latter being secured to a rod 27 which in turn is connected with the brake mechanism (not shown) of the vehicle. Fixedly secured to the shaft 20 is an arm 29 provided with a transversely extending pin 30 which projects into a slot 31 formed in a member 32, the latter being connected at one end to a flexible cable 33 which is slidably disposed within a sheath or guide 34. One end of the guide 34 is secured to the frame 18 by means of a clip 35 while the other end of the guide is secured to the dash board 14 by a suitable attaching means 36. A contractile coil spring 37 is connected at one end as at 39 to member 32, its other end being connected as at 40 to the frame 18. The spring 37 normally urges the member 32 toward one position. The mechanism control or brake actuating means of my invention is mounted upon a suitable support, as illustrated in Figure 1, the support being a bracket 43 secured to the dash board 14 or other portion of the vehicle. The mechanism control is inclusive of a support or bracket 44 which is mounted upon the bracket 43 by means of rivets 45 or other securing means. Fulcrumed upon a rivet or shaft 48 carried by the support 44 is a lever member 47 as shown in Figures 2 and 3. The cable 33 is provided at the end adjacent the lever with a clevis 49 connected by means of a pin 51 to projecting ears 57 formed on the lever member 47 for establishing an operative connection between the lever member 47 and the brake mechanism of a vehicle. The support 44 is formed with an opening 46 to accommodate the clevis 49. The lever member 47 is formed of sheet metal with a body portion 50 which terminates at its lower extremity in a foot pad portion 51. This lever or lever member is preferably formed of matched sections or stamping 50 of sheet metal which when assembled form a closed configuration as illustrated in Figure 7. Spaced portions of the juxtaposed edges of the matched sections are not in engagement, being relieved as indicated at 52. The abutting portions of the lever body sections are welded together as at 53 to form an integral lever body. The upper extremity of the lever body is formed with spaced parallel side walls 54 and 55 which straddle a vertically disposed uniplaner portion 56 of the member 44. Connecting the wall portions 54 and 55 of the lever is a rivet or stub shaft 58 upon which is mounted a bushing or sleeve 59 which extends into suitable openings in the walls 54 and 55 of the lever. The sleeve 59 forms an abutment for engagement with the lower surface of a bar 60, the latter being formed with an enlarged circular head portion 61 pivotally carried by member 44 by reason of the formation of an opening to receive the head portion 61, the opening being provided with a restricted throat in order to prevent disassembly of the bar 60 with respect to its support yet permitting limited pivotal movement of the bar with respect to the support. A cushion or shock absorber 70 is provided in the form of a U-shaped sheet metal member covered or coated with rubber or the like straddles a portion of the support and the enlarged head 61, the member 70 and head 61 being provided with aligned openings to receive a securing rivet 72 to retain the member 70 in position. The parallel wall portions of member 70 serve to eliminate lateral movement of the bar 60 with respect to the support. The rubber buffer or cushion 70 is arranged to be engaged by a pad portion 71 formed on the lever member 47 to absorb or cushion the impact of the lever when the same is released and returns to brake releasing position.

The walls 54 and 55 of the lever are provided with suitable openings 63 to accommodate a clutch member or roller 64, the periphery of the clutch roller 64 being arranged for engagement with the upper surface of bar 60 while the lower surface of bar 60 is arranged for engagement with the sleeve or abutment 59. The openings 63 have rectangular portions 65 within which is snugly fitted a rectangularly shaped hardened abutment block or member 66, the lower surface 67 of which is arranged to be engaged by the periphery of the clutch element or roller 64 to retain the lever member 47 in adjusted position.

Means are provided for actuating the clutch roller 64 into and out of clutching position. This means is inclusive of a manipulating lever or arm 74 having a portion 75 of U-shaped configuration arranged to straddle the upper portion of the lever 47. The manipulating member 74 is pivotally supported upon the lever member 47 by means of the rivet 58 which carries the sleeve 59 as shown in Figure 3. The parallel side walls of portion 75 are provided with vertically arranged slots 76 of a dimension to accommodate cylindrical tenons 77 formed integrally with the clutch roller 64. The tenons 77 are a slidable fit between the edges of slots 76 so that no lost motion between the tenons and walls of the slots exists and comparatively small movement of manipulating arm 74 about the axis of rivet 58 will actuate the clutch element 64. As particularly illustrated in Figures 5 and 6, the bight portion 75 is formed with openings through which is interlocked a resilient member or hair pin spring 78, the extremities of which contact the tenons 77 to maintain the clutch member 64 in proper relation with the manipulating arm 74 and the bar 60 as well as to function as an antirattle means. Means are provided for resiliently urging the manipulating arm 74 toward clutch engaging position and for retaining the clutch member in released position when desired. This means is inclusive of an element 81 one end of which is formed with an eye 82 through which extends a shaft 83 for pivotally supporting the element 81 upon the lever 47. The shaft 83 is formed with a reduced tenon 84 which extends through aligned openings in the side walls of the lever 47 and is swaged as at 85 to secure the shaft to the lever member. One end 87 of a coil spring 86 engages in an opening in the lever member 47 while the other end of the spring is configurated as at 89 to engage the element 81 for urging rotation of the latter in a counterclockwise direction as viewed in Figures 2 and 5. The body portion of bracket 81 is of U-shaped configuration and terminates at its free end in a semi-annular or cup-shaped portion 90.

An actuating means for the clutch element and arm 74 is provided in the form of a rod 93 which is slidably supported in a bracket 94 riveted as at 95 or otherwise secured to the lever support 44. Secured to the outer extremity of rod 93 is a manipulating knob 96. The other end of the rod 93 is formed with a laterally extending portion 97 which projects through an opening formed in the lower extremity of the clutch manipulating arm 74. Also mounted upon the projection 97 and disposed at each side of member 74 are discs 99 of circular configuration which are adapted under certain conditions of operation to be received in the semi-annular or cup shaped portion 90 of element 81. Portion 97 of the rod 93 is formed with radially extending projections 100 to position the inner-most discs 99 as shown in Figure 3 and a cotter pin 102 is inserted in an opening in portion 97 to maintain the discs and arm 74 in assembled relationship. It should be noted that the discs 99 function as antifriction means or rollers to facilitate their engagement and disengagement with the element 81. As shown in Figure 5, the bracket or member 81 under the influence of spring 86, normally urges the arm 74 in a direction to maintain the clutch element 64 in clutch engaging position.

The operation of the device of my invention is as follows:

As illustrated in Figure 1 the lever member 47 as indicated in full lines is in normal or "brake release" position. When it is desired to affect a setting of the emergency or parking brakes, the vehicle operator oscillates the lever 27 in a clockwise direction as viewed in Figure 1 about its pivotal support 48 by exerting foot pressure upon the foot pad 51. As the lever 47 is moved toward "brake setting" position the clutch member or roller 64 does not restrain movement of the lever. During movement of the lever 47 toward "brake setting" position, the manipulating member 74 is resiliently urged in a direction to carry the clutch member or roller 63 into wedging engagement with the abutment 66, and the upper arcuate surface of bar 60 under the influence of spring 86 acting upon element 81, the latter being in engagement with discs 99 carried by the arm 77. When the lever member 47 has been moved an amount sufficient to effect a setting of the brake mechanism, the operator removes his foot from the pad portion 51, and the clutch roller 64 becomes wedged between the upper surface of bar 60 and the hardened abutment block 66, the bar 60 being in engagement with the abutment sleeve 59, the lever member 47 is thus retained in brake set position as shown in Figure 5. This action is effected instantaneously as the clutch manipulating member 74 is under the influence of spring 86 acting on the bracket 81 tending to rotate member 74 in a direction urging the roller into wedging relation with the block 66 and the bar 60. When the operator desires to release the brakes, he grasps the knob 96 and exerts an outward pull upon the same which rotates the manipulating member 74 in a counterclockwise direction. A very slight pivotal movement of member 74 relative to the lever 47 is all that is required to release the clutch roller 64 after which the lever member 47 is automatically returned to its normal brake releasing position under the influence of spring 37. The impact of the return movement of lever member 47 is cushioned by the pad portion 71 of the lever member engaging the shock absorber or cushion member 70. If the operator desires to retain the clutch roller 64 in a released position, the knob 96 is withdrawn a distance sufficient to bring the disc 99 into the cup shaped portion 90 of the bracket 81 as shown in Figure 2. The member 74 is thereafter retained in clutch releasing position until the operator exerts inward pressure upon the knob 96 to cause the discs 99 to move out of engagement with the cup-shaped portion 90 of the bracket 81 so that the parts attain the position as shown in Figure 5.

It is apparent that, within the scope of the invention, modifications and different arrangements may be made other than is herein disclosed, and the present disclosure is illustrative merely, the invention comprehending all variations thereof.

What I claim is:

1. Mechanism control including a support; a foot operated lever formed of sheet metal fulcrumed upon said support; a foot pad formed at one end of said lever; said lever having spaced wall portions formed with aligned openings; an abutment block of hardened material fitting in the openings in said wall portions; an arm associated with said support provided with a clutching surface; a clutch roller formed with projecting tenon portions; a manipulating member for said clutch roller pivotally connected to said lever; said member having slots to receive the tenon portions on said roller; resilient means acting on said member for normally urging the clutch roller into clutching engagement with said abutment block and the upper surface of said arm; a second resilient means carried by said manipulating member and engageable with the tenon portions of said roller and arranged to exert pressure in a direction normal to the clutching surface for maintaining the latter in engagement with the arm irrespective of the relative position of said member, and a cylindrical abutment sleeve rotatably supported upon said lever and engaging a lower surface of the arm.

2. Mechanism control including a support; a foot operated lever formed of sheet metal fulcrumed upon said support; a foot pad provided at one end of said lever; an arm associated with said support having a clutching surface; said lever having spaced wall portions formed with aligned openings; an abutment block of hardened material fitting in the aligned openings in said wall portions; a clutch roller disposed between said abutment block and the clutching surface on said arm; a manipulating member for the clutch roller; a stub shaft extending through the wall portions of the lever; said manipulating member being pivotally supported on said stub shaft; said clutch roller having tenon portions extending into slots formed in said manipulating member; a cylindrical abutment sleeve rotatably mounted on said stub shaft and adapted to engage said arm; a spring acting on said member for normally urging the clutch roller into clutching engagement with said abutment block and said arm; and a second spring carried by said manipulating member engageable with the tenon portions of said roller and arranged to exert pressure on said roller in a direction normal to the clutching surface of said arm.

ROBERT S. HINSEY.

REFERENCES CITED

The following references are of record in the file of this patent:

UNITED STATES PATENTS

| Number | Name | Date |
| --- | --- | --- |
| 1,831,335 | White | Nov. 10, 1931 |
| 2,192,443 | Illmer | Mar. 5, 1940 |
| 2,222,492 | Snell | Nov. 19, 1940 |
| 2,299,508 | Skoreen | Oct. 20, 1942 |
| 2,308,898 | Skoreen | Jan. 19, 1943 |
| 2,309,454 | Weller | Jan. 26, 1943 |